United States Patent
Fulton

(10) Patent No.: US 8,836,260 B2
(45) Date of Patent: Sep. 16, 2014

(54) METHOD AND APPARATUS FOR REDUCING TORQUE VARIATION IN MOTOR DRIVE SYSTEMS

(71) Applicant: Remy Technologies, L.L.C., Pendleton, IN (US)

(72) Inventor: David A. Fulton, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 143 days.

(21) Appl. No.: 13/670,654

(22) Filed: Nov. 7, 2012

(65) Prior Publication Data

US 2014/0125258 A1　May 8, 2014

(51) Int. Cl.
*H02P 6/18*　　(2006.01)
*H02P 6/08*　　(2006.01)
*H02J 7/14*　　(2006.01)
*H02P 9/14*　　(2006.01)

(52) U.S. Cl.
CPC ............... *H02P 6/08* (2013.01); *H02J 7/1446* (2013.01); *H02P 9/14* (2013.01)
USPC ........... 318/400.34; 318/400.01; 318/400.32; 318/800; 318/801; 318/432; 318/459

(58) Field of Classification Search
CPC .............................. H02P 27/06; H02P 27/08
USPC ............ 318/400.01, 400.02, 400.07, 400.14, 318/400.15, 400.17, 400.2, 400.21, 400.23, 318/400.26, 400.27, 400.32, 400.33, 318/400.34, 400.35, 400.38, 400.4, 701, 318/721, 722, 727, 799, 800, 801, 805, 432, 318/459, 362, 374, 375, 376; 388/909, 388/928.1, 930
See application file for complete search history.

(56) References Cited

U.S. PATENT DOCUMENTS

| | | | |
|---|---|---|---|
| 4,422,040 A * | 12/1983 | Raider et al. | 324/765.01 |
| 2001/0040437 A1 | 11/2001 | Wakashiro et al. | |
| 2010/0168946 A1 | 7/2010 | Snyder | |
| 2012/0268052 A1 * | 10/2012 | Nam et al. | 318/494 |

FOREIGN PATENT DOCUMENTS

JP　　2009-28003 A　　12/2009
KR　　2011-0072143 A　　6/2011

OTHER PUBLICATIONS

Notification of Transmittal of the International Search Report and the Written Opinion of the International Searching Authority, or the Declaration; PCT/US2013/068919; Mailed Feb. 24, 2014, 10 pages.

* cited by examiner

Primary Examiner — Anthony M Paul
(74) Attorney, Agent, or Firm — Cantor Colburn LLP

(57) ABSTRACT

A method for controlling a specific electric machine includes receiving with a controller a back electromotive force (BEMF) coefficient for the specific electric machine. The controller is configured to control operation of an inverter coupled to the electric machine where the inverter is configured to provide or receive multi-phase electricity to or from the electric machine in motor mode or generator mode, respectively. The method further includes receiving with the controller an input related to a selected torque to be applied by or a selected power to be removed from the electric machine. The method further includes determining a first electrical parameter the inverter is to apply to in motor mode or a second electrical parameter the inverter is to convert power to in generator mode using the BEMF coefficient, and applying the first electrical parameter to the electric machine or converting the received power to the second electrical parameter.

19 Claims, 5 Drawing Sheets

METHOD AND APPARATUS FOR REDUCING TORQUE VARIATION IN MOTOR DRIVE SYSTEMS

BACKGROUND OF THE INVENTION

Exemplary embodiments pertain to the art of electric machines and, more particularly, to an electric machine used in electric and hybrid electric vehicles.

Electric vehicles (EVs) or hybrid electric vehicles (HEVs) are gaining in popularity as gas prices increase and consumers have greater awareness of environmental impacts caused by traditional vehicles. Both EVs and HEVs use a traction motor powered by electricity for propulsion to reduce emissions.

In order for EVs and HEVs to be accepted by the public, the EVs and HEVs must have drivability characteristics that are similar to hydrocarbon fueled vehicles. For example, if deceleration of the traction motor is faster than expected during regenerative braking, then the vehicle can have a jarring braking action. Similarly, if acceleration is faster than expected, then the vehicle can have jarring acceleration. These types of undesirable actions may lead to drivability concerns and complaints by consumers. Hence, improved controllability of traction motors would be appreciated in the EV and HEV market segments.

BRIEF DESCRIPTION OF THE INVENTION

Disclosed is a method for controlling a specific electric machine. The method includes: receiving with a controller a back electromotive force (BEMF) coefficient for the specific electric machine being controlled, the controller being configured to control operation of an inverter coupled to the electric machine, the inverter being configured to provide multi-phase electricity to the electric machine in motor mode or to receive multi-phase electricity from the electric machine in generator mode; receiving with the controller an input related to a selected torque to be applied by the electric machine in the motor mode or an input related to a selected power to be removed from the electric machine in the generator mode; determining a first voltage or current having a first characteristic the inverter is to apply to the electric machine in the motor mode using the BEMF coefficient in order to achieve the selected torque or determining a second voltage or current having a second characteristic the inverter is to convert power to using the BEMF coefficient in order to remove the selected power from the electric machine in the generator mode; and applying the first voltage or current to the electric machine in the motor mode using the inverter or converting power received from the electric machine in the generator mode to the second voltage or current using the inverter.

Also disclosed is an apparatus for controlling a specific electric machine. The apparatus includes: an inverter coupled to the electric machine and configured to invert direct current electricity to multi-phase electricity that is applied to the electric machine in motor mode or to convert multi-phase electricity received from the electric machine in generator mode to direct current electricity; and a controller coupled to the inverter. The controller is configured to: receive a back electromotive force (BEMF) coefficient for the specific electric machine being controlled; receive an input related to a selected torque to be applied by the electric machine in the motor mode or an input related to a selected power to be removed from the electric machine in the generator mode; and determine a first voltage or current having a first characteristic the inverter is to apply to the electric machine in the motor mode using the BEMF coefficient in order to achieve the selected torque or determine a second voltage or current having a second characteristic the inverter is to convert received multi-phase electricity to using the BEMF coefficient in order to remove the selected power from the electric machine in the generator mode.

Further disclosed is a vehicle system. The vehicle system includes: a vehicle having a drive mechanism; a specific electric machine coupled to the drive mechanism and configured to power the vehicle or to remove energy from the vehicle to provide braking power; a battery configured to provide power to the vehicle or to store removed energy; an inverter configured to invert direct current electricity from the battery to multi-phase electricity applied to the electric machine operating in motor mode or to convert multi-phase electricity from the electric machine operating in generator mode to direct current electricity provided to the battery; and a controller coupled to the inverter. The controller is configured to: receive a back electromotive force coefficient for the specific electric machine being controlled; receive an input related to a selected torque to be applied by the electric machine in the motor mode or an input related to a selected power to be removed from the electric machine in the generator mode; and determine a first voltage or current having a first characteristic the inverter is to apply to the electric machine in the motor mode using the BEMF coefficient in order to achieve the selected torque or determine a second voltage or current having a second characteristic the inverter is to convert received multi-phase electricity to using the BEMF coefficient in order to remove the selected power from the electric machine in the generator mode.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
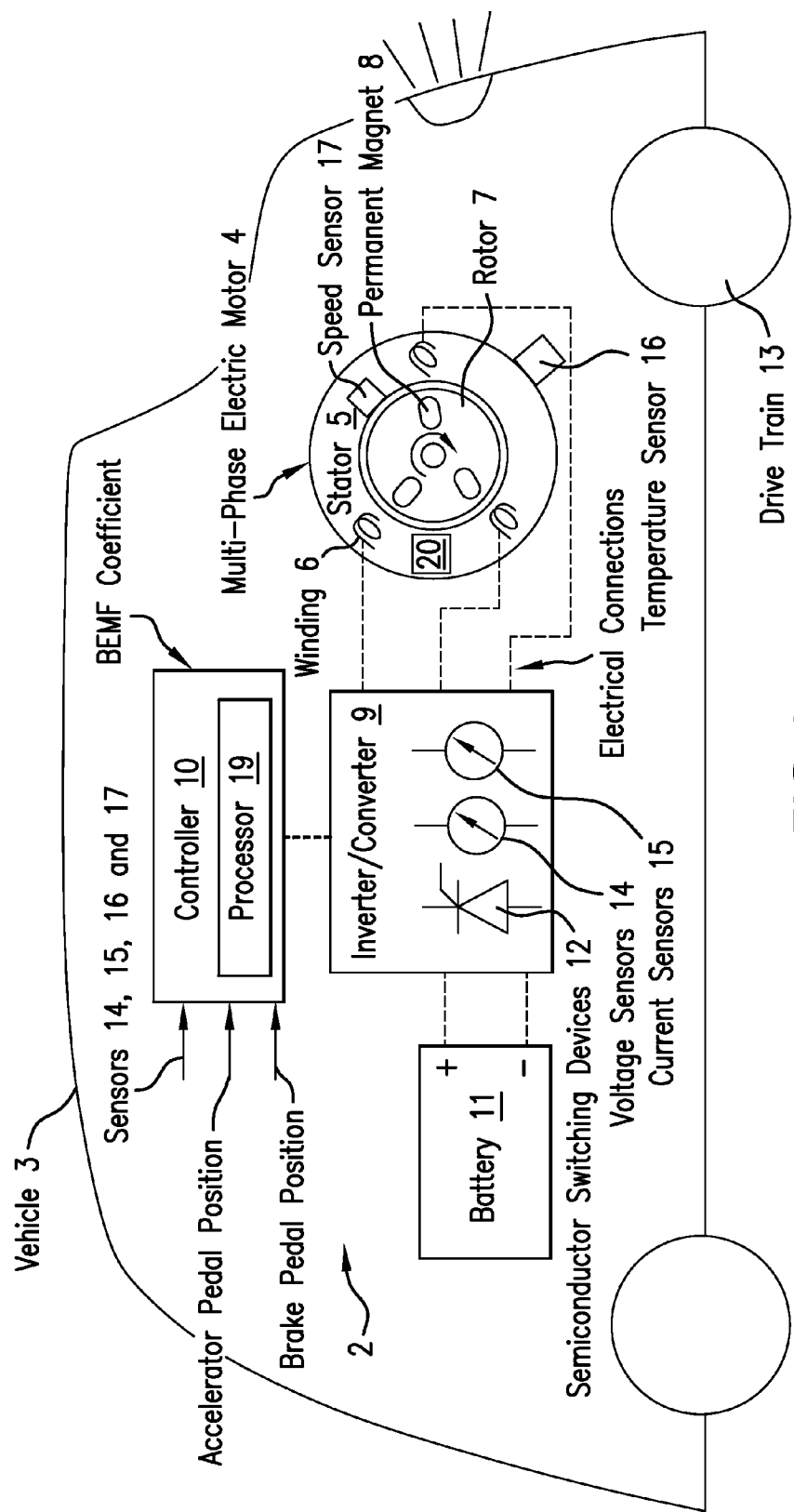
FIG. 1 is a cross-sectional view of an exemplary embodiment of a vehicle having an electric traction motor.

A detailed description of one or more embodiments of the disclosed apparatus and method are presented herein by way of exemplification and not limitation with reference to the Figures.

Disclosed are method and apparatus for reducing an output torque variation of an alternating current (ac) electric motor driven by an inverter. The output torque variation relates to a variation from the specified output torque of the ac electric motor, such as due to manufacturing tolerances, for a specified electrical input. By reducing the variation of the output torque from the specified value, more accurate application of a desired torque may be produced resulting in a desired motor response.

The disclosed method and apparatus reduce the torque variation by tuning a motor controller, which may be included as part of the inverter, to adjust the magnetic flux linkage of the specific motor being controlled. For example, assume that 100 amperes-rms (root-mean-square) is applied by the inverter to a specific motor and that this results in 100 Weber-turns of magnetic flux linkage in the motor and the motor providing a desired required torque of 200 N-m. If, because of normal production tolerances, another motor has 110 Wb-turns of magnetic flux resulting from the same application of 100 A(rms), the motor controller can control the inverter to reduce the applied electrical current to 90.9 A(rms) (100*100=90.9*110) resulting in the other motor producing the same desired required torque of 200 N-m. Hence, by adjusting the applied current (or related voltage), a desired output torque may be achieved without regard to reducing manufacturing tolerances.

To accomplish adjusting the magnetic flux linkage, it is necessary for the motor controller to acquire information about the magnetic flux linkage for the specific motor being controlled. Since, magnetic flux linkage is proportional to the back electromotive force (BEMF) coefficient (BEMF/rotational speed or BEMF/rpm) at a given temperature, the BEMF coefficient data for the specific motor can be used as a substitute for the magnetic flux linkage for that same motor. In one or more embodiments, the BEMF coefficient of a specific motor may be measured after production of that motor and the BEMF coefficient printed on a label affixed to the motor. In one or more embodiments, the label is a UPC label that may be scanned by the motor controller or the label may be a radiofrequency identification device (RFID) tag that may be read by an RFID reader in the motor controller. One advantage of these types of labels is that the BEMF coefficient can be entered quickly without transcription error into the motor controller during assembly of the controller-inverter-motor system or if the motor is replaced with another motor.

In one or more alternative embodiments, the system is configured to self-measure or self-learn the BEMF coefficient. For example, the controller can start a specific motor using a default value of the BEMF coefficient, then measured the BEMF, speed, and temperature, and then calculate the actual BEMF coefficient for that specific motor. One advantage to the system self-learning the BEMF coefficient is that if the motor ever had to be replaced, such as in an electric vehicle of a hybrid electric vehicle, the self-learning process can allow the controller to learn the new BEMF for the replacement motor automatically.

An electric machine system 2 in a vehicle application in accordance with an exemplary embodiment is illustrated in FIG. 1. A vehicle 3 is operated by the electric machine system 2. The electric machine system 2 includes an alternating current multi-phase electric motor 4. The electric motor 4 has a stator 5 having windings 6 and a rotor 7 having permanent magnets 8. The electric motor 4 may be operated as a motor converting electric power to mechanical power in motor mode or it may operate as a generator converting mechanical power to electric power in generator mode. In one or more embodiments, the generator mode is used for braking of the vehicle 3 and may be referred to as regenerative braking. Since the motor 4 may be operated as a motor and/or generator, the motor 4 may be referred to as an electric machine.

An inverter 9 is coupled to the electric motor 4 and is configured to invert direct current (i.e., zero frequency) electric power to multi-phase electric power and provide the multi-phase electric power to the motor 4. In order to control the motor 4, the inverter 9 may provide the multi-phase power with one or more electrical characteristics. For example, the frequency of the applied multi-phase electric power may determine the rotational speed of the rotating magnetic field provided by the stator 5 and, thus, the rotational speed of the motor 4. The magnitude of the voltage or current (peak or rms) and/or a time duration that the voltage or current may be applied during a frequency cycle (i.e., pulse width modulation) may determine the mechanical torque applied by the motor 4 to the drivetrain 13 of the vehicle 3. The inverter 9 generally includes semiconductor switching devices 12 for inverting the dc power to multi-phase power, and voltage sensors 14 and current sensors 15 for sensing voltage and current, respectively, in one or more electrical phases. It can be appreciated that the inverter 9 while referred to as an inverter may be also be configured as a converter or rectifier to convert multi-phase power received from the motor 4 in generator mode to dc power to recharge a battery 11 for regenerative braking. In such a mode, the switching devices 12 regulate the amount of electrical power removed from the motor 4 and supplied to the battery 11 such as by pulse width modulation of the generated current to provide a desired amount of braking.

Figure 2:
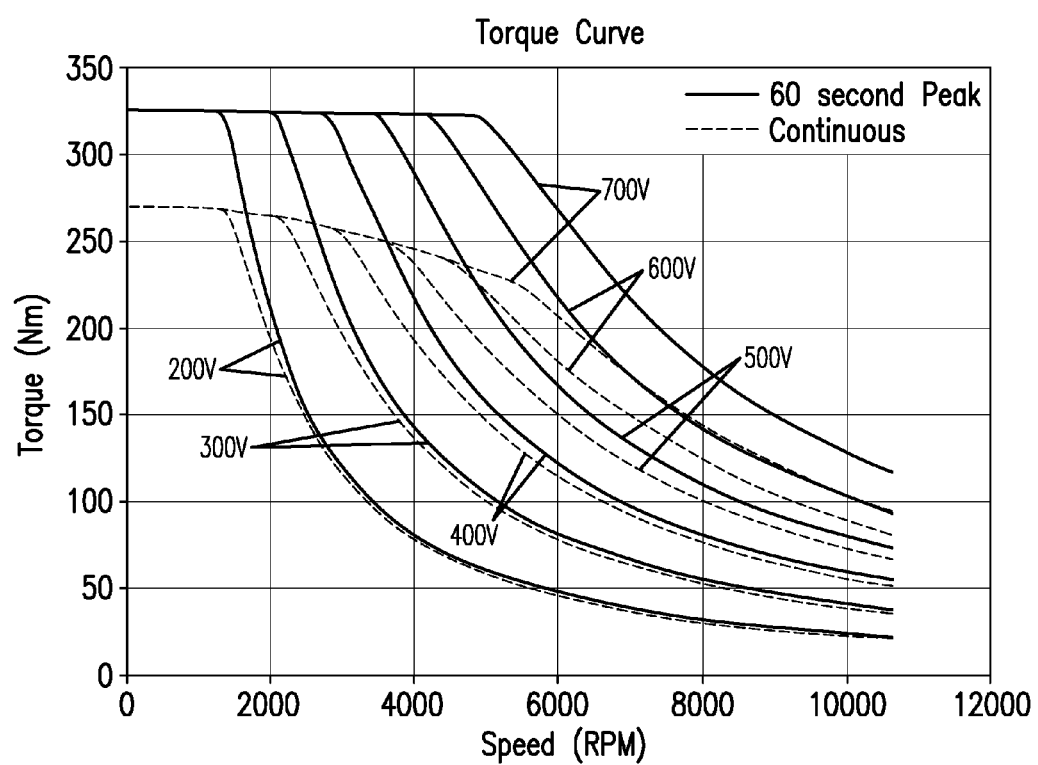
FIG. 2 is an exemplary embodiment of torque versus speed curves for different voltages applied to the electric traction motor.
Figure 3:
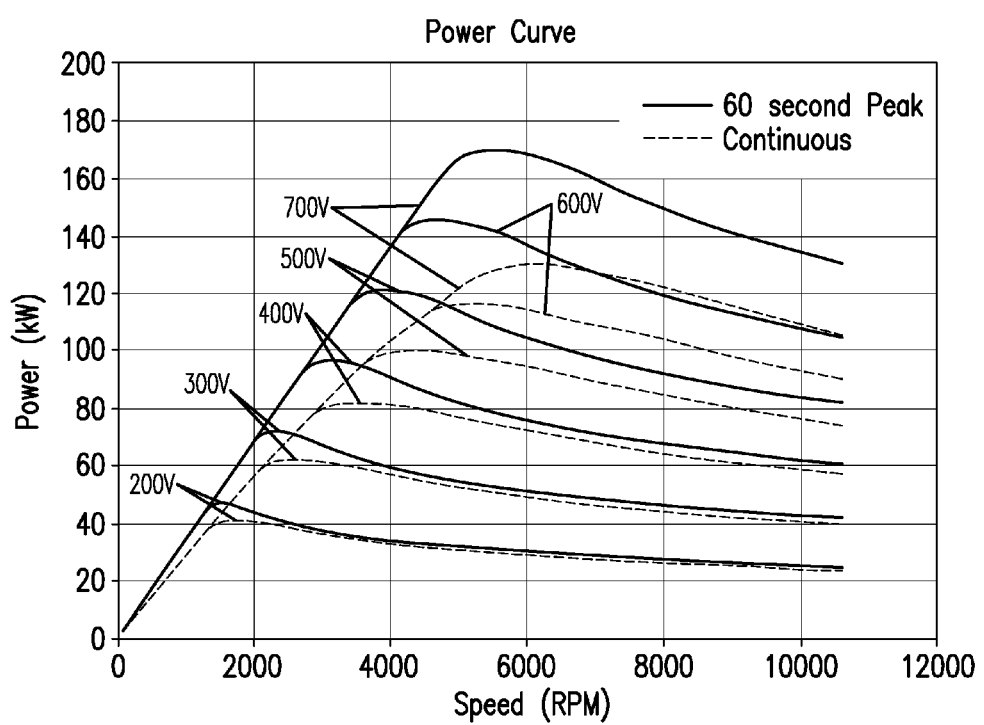
FIG. 3 is an exemplary embodiment of power versus speed curves for different voltages applied to the electric traction motor.

FIG. 2 presents an exemplary embodiment of torque versus speed curves for different voltages applied to the electric traction motor 4. It is noted that as the applied voltage (and thus the applied current) increases for a certain motor speed, the torque also increases. The torque increase is due to an increase in the magnetic flux linkage between the stator 5 and the rotor 7 related to the increase in the applied current. As the output torque increases, the output power also increases as illustrated in FIG. 3. As these curves describe operation of the motor 4, they may be used by an inverter controller to control operation of the inverter 9 so that the motor 4 responds as desired.

Referring back to FIG. 1, a controller 10 is coupled to the inverter 9. In can be appreciated that functions of the controller 10 may be incorporated into the inverter 9. The controller 10 is configured to control electrical aspects of the inverter 9 in order to achieve a desired result such as increasing the torque applied by the motor 4 in the motor mode or regulating the amount of power removed from the motor 4 in the generator mode. In order to account for variations of magnetic flux coupling between different motors 4, the controller 10 is configured to receive the BEMF coefficient for the specific motor 4 that is to be operated. As noted above, the BEMF is a measure of an amount of magnetic flux coupling between the stator 5 and the rotor 7. The controller 10 is configured to compensate for the variations of the amount of magnetic flux coupling. In one example, if the BEMF is less than expected (based on the motor rating), then the resulting output torque for a given applied voltage will be less than expected. In this example, the controller 10 may increase the voltage, current or pulse width in each phase to increase the magnetic flux coupling to the expected corresponding amount of flux coupling resulting in the motor 4 providing the expected output torque. In another example, if the BEMF is higher than expected (based on the motor rating), then the resulting output torque for a given applied voltage will be greater than expected. In this example, the controller 10 may decrease the voltage, current or pulse width to decrease the magnetic flux coupling to the expected corresponding amount of flux coupling resulting in the motor 4 providing the expected output torque. By applying the intended amount of torque to the drivetrain 13 and not another amount of torque due to variation in the magnetic flux coupling, acceleration and movement of the vehicle 3 will be what is intended thereby eliminating or limiting any unintended accelerations.

The controller 10 works similarly in the generator mode for regenerative braking. In the example of the BEMF being lower than an expected amount based on the motor rating, then the resulting voltage, current or power being generated by the motor 4 for a given motor speed will be less than expected. In order to compensate for the lower BEMF, the controller 10 may increase the pulse width of the voltage or current in each phase to remove the intended amount of power from the motor 4. In the example of the BEMF being greater than an expected amount based on the motor rating, then the resulting voltage, current or power being generated will be greater than intended. Hence, in this example without compensation, a vehicle operator may experience a greater amount of deceleration than expected. In order to compensate for the higher BEMF in this example, the controller 10 may decrease the pulse width of the voltage or current in each phase to remove the intended amount of power from the motor 4.

Figure 4:
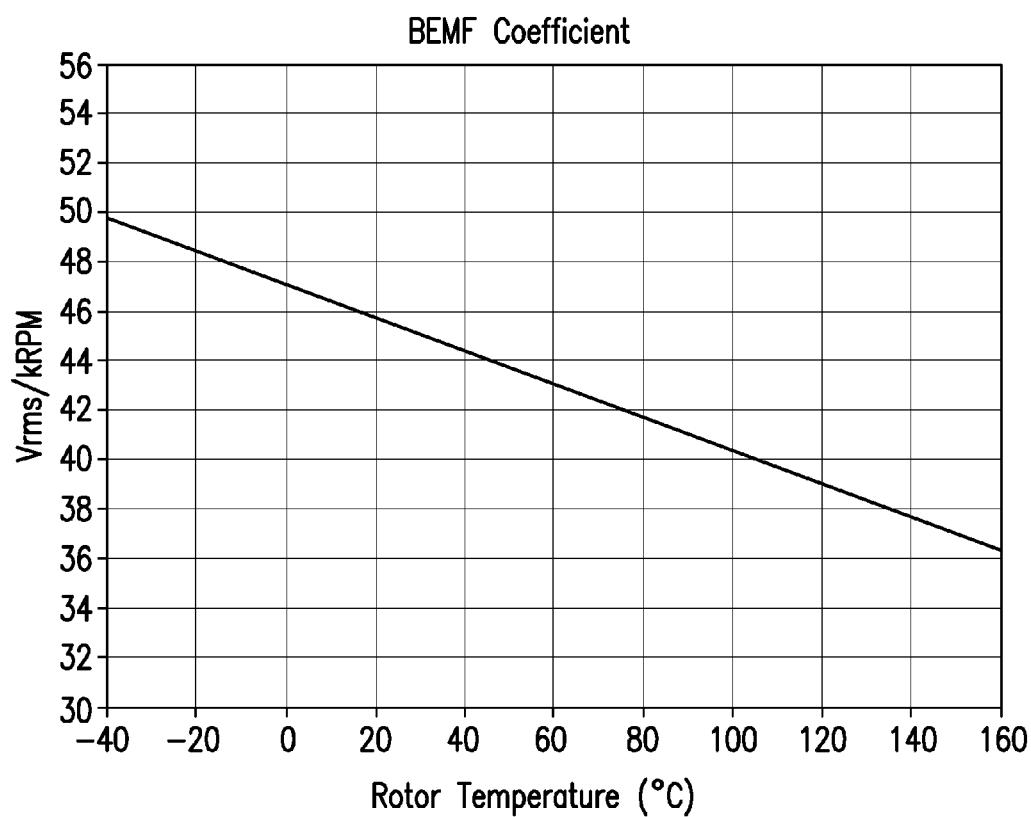
FIG. 4 is an exemplary embodiment of a back electromotive force coefficient versus temperature curve for the electric traction motor.

The controller 10 may receive several inputs in order to calculate the correct amount of current or power that is to be applied to or removed from the motor 4. As noted above, one of the inputs is the BEMF coefficient for the specific motor 4 that is going to be operated. Another input is a temperature of the motor 4 as sensed by a temperature sensor 16. The motor temperature is sensed because, in general, the BEMF coefficient is a function of temperature as illustrated by the BEMF coefficient versus temperature curve in FIG. 4. The slope of the curve is generally constant, so that by measuring the temperature and knowing the slope, the BEMF coefficient may be determined. Other inputs to the controller 10 may include the motor rotational speed as sensed by a speed sensor 17, desired amount of power output from the motor 4 as determined by accelerator pedal position as one example, and desired amount of braking or power removal from the motor 4 as determined by brake pedal position as one example. In one or more embodiments, knowing the motor speed helps to determine a point on a motor operating characteristic curve the motor is operating at in order to calculate changes in operating parameters of the inverter 9 due to changes in one or more inputs.

In one or more embodiments, a default or nominal BEMF coefficient for a model of the motor 4 being used is programmed into the controller 10. The default or nominal BEMF coefficient relates to a nominal rated amount of magnetic flux coupling that is expected provide the rated operating characteristics for the motor 4. The nominal rating, however, does not account for variations in the actual magnetic flux coupling due to manufacturing tolerances. In these embodiments, an amount of deviation of the specific BEMF coefficient from the nominal BEMF coefficient rating may be used to determine an amount of compensation or adjustment of the electrical parameters applied to each phase of the motor 4 by the inverter 9. For example, in one or more embodiments, if the deviation of the specific BEMF coefficient from the nominal coefficient is 10 percent (i.e., the specific BEMF coefficient is 10 percent higher than the nominal BEMF coefficient), then the controller 10 may send a command to the inverter 9 to decrease the current in each phase by 10 percent to compensate for the deviation.

In order to quickly and efficiently input the BEMF coefficient for the specific electric machine 4 being operated without error, the electric machine 4 may include a tag 20, such as UPC tag or radio frequency identification device (RFID) tag, containing that BEMF coefficient. In such an embodiment, the controller 10 may be configured to scan the UPC tag or read the RFID tag in order to receive the BEMF coefficient for that specific electric machine 4.

It can be appreciated that the functions of the controller 10 may be performed by a processor 19. Further, various analysis components may be used in the controller 10 such as a digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Figure 5:
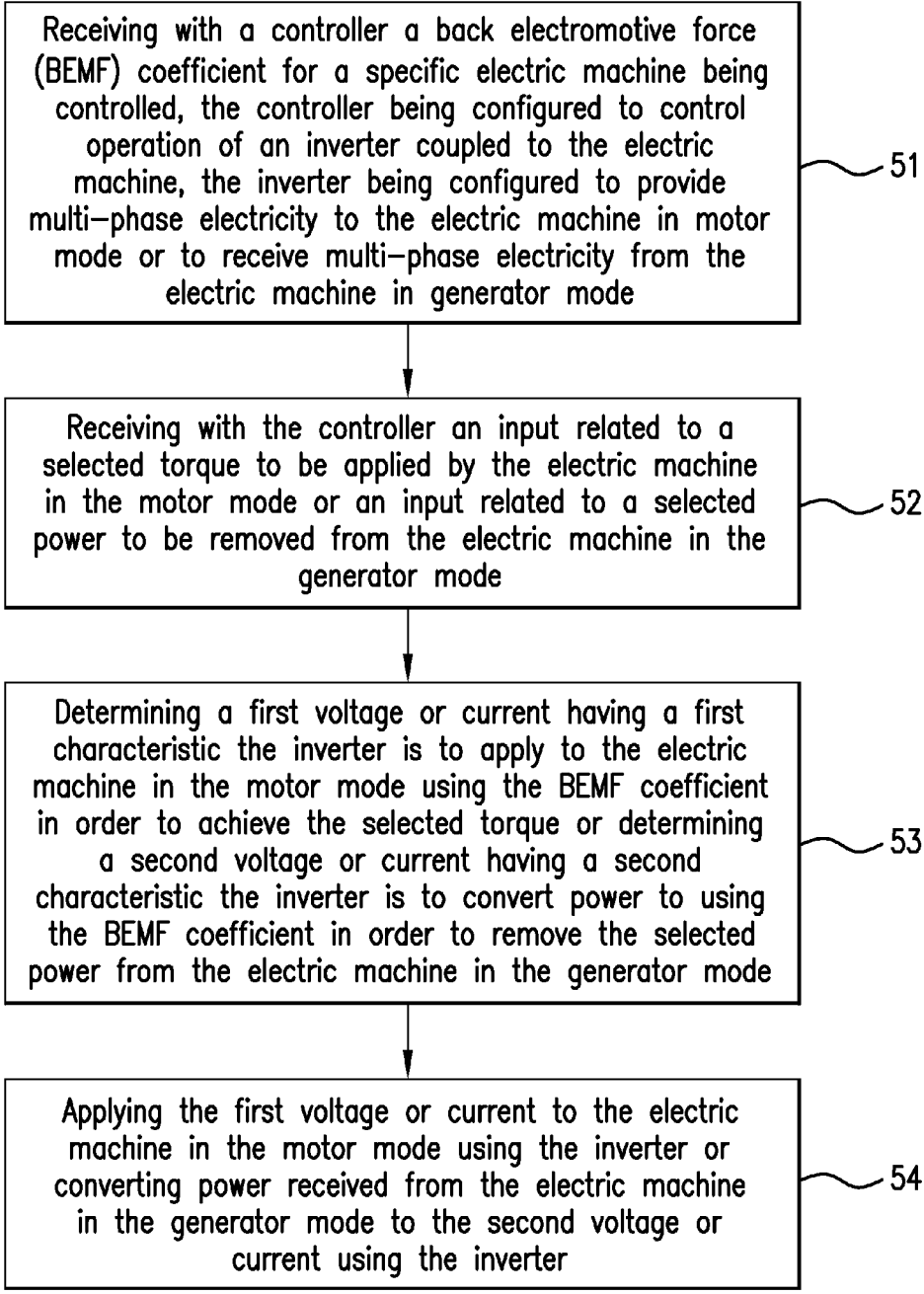
FIG. 5 is a flow chart for a method for controlling a specific electric motor.

FIG. 5 is a flow chart for a method 50 for controlling a specific electric machine. Block 51 calls for receiving with a controller a back electromotive force (BEMF) coefficient for the specific electric machine being controlled, the controller being configured to control operation of an inverter coupled to the electric machine, the inverter being configured to provide multi-phase electricity to the electric machine in motor mode or to receive multi-phase electricity from the electric machine in generator mode. This block can include self-measuring the BEMF for the specific electric machine being operated. Block 52 calls for receiving with the controller an input related to a selected torque to be applied by the electric machine in the motor mode or an input related to a selected power to be removed from the electric machine in the generator mode. Block 53 calls for determining a first voltage or current having a first characteristic the inverter is to apply to the electric machine in the motor mode using the BEMF coefficient in order to achieve the selected torque or determining a second voltage or current having a second characteristic the inverter is to convert power to using the BEMF coefficient in order to remove the selected power from the electric machine in the generator mode. This block can also include receiving a nominal BEMF coefficient for a type or model of the electric machine and determining the first characteristic or the second characteristic based upon a deviation of the received BEMF (in block 51) from the nominal BEMF coefficient. Block 54 calls for applying the first voltage or current to the electric machine in the motor mode using the inverter or converting power received from the electric machine in the generator mode to the second voltage or current using the inverter.

One advantage of the method and apparatus disclosed herein is a significant cost savings to reduce torque variation. Most EVs and HEVs have powertrain controllers that are calibrated for optimal operation with a certain or nominal motor performance (e.g., torque as a function of speed, current, and current vector angle). For a given current vector, motor torque will vary mainly due to variation in assembled magnetic flux linkage between the rotor and the stator windings. There are component variations that contribute to magnetic flux linkage variation, including magnet properties (Br, Hci), magnetization process, magnet dimensions, lamination steel properties (e.g., permeability), lamination dimensions, and lamination stacking factor. One way to reduce output torque variation, from individual motor to individual motor, is to reduce the variation of these individual contributors. However, there are industry standard tolerances for each of these contributors, and they result in a certain level of torque variation for any electric motor design. To reduce torque variation below the industry level would require decreasing the tolerances of the individual contributors to below industry standards with the resultant significant increase in cost of the motors.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or any combination of terms. The term "couple" relates to one component being coupled either directly to another component or indirectly to the another component via one or more intermediate components. The terms "first" and "second" are used to distinguish terms and do not denote a particular order.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method for controlling a specific electric machine, the method comprising:
   receiving with a controller a back electromotive force (BEMF) coefficient for the specific electric machine being controlled, the controller being configured to control operation of an inverter coupled to the electric machine, the inverter being configured to provide multi-phase electricity to the electric machine in motor mode or to receive multi-phase electricity from the electric machine in generator mode;
   receiving with the controller an input related to a selected torque to be applied by the electric machine in the motor mode or an input related to a selected power to be removed from the electric machine in the generator mode;
   determining a first voltage or current having a first characteristic the inverter is to apply to the electric machine in the motor mode using the BEMF coefficient in order to achieve the selected torque or determining a second voltage or current having a second characteristic the inverter is to convert power to using the BEMF coefficient in order to remove the selected power from the electric machine in the generator mode; and
   applying the first voltage or current to the electric machine in the motor mode using the inverter or converting power received from the electric machine in the generator mode to the second voltage or current using the inverter.

2. The method according to claim 1, wherein the first characteristic comprises at least one selection from a group consisting of a peak value, a root-mean-square value, a frequency, and a time duration for application during a frequency cycle and the second characteristic comprises at least one selection from a group consisting of a peak value, a root-mean-square value, a frequency, and a time duration for conversion during a frequency cycle.

3. The method according to claim 1, wherein the inverter is coupled to a battery and the battery is configured to supply direct current power to the inverter in the motor mode or to receive direct current power converted from multi-phase electricity by the inverter in the generator mode.

4. The method according to claim 1, wherein the electric machine comprises a stator having multi-phase windings and a rotor having permanent magnets.

5. The method according to claim 1, wherein the electric machine is disposed in a vehicle and the input related to a selected torque comprises an input from an accelerator pedal and the input related to a selected power comprises an input from a brake pedal.

6. The method according to claim 1, further comprising determining a speed of the motor using a speed sensor and inputting the speed into the controller for determining an operating point of the electric machine from which the first voltage or current or the second voltage or current are determined.

7. The method according to claim 1, further comprising determining a temperature of the electric machine using a temperature sensor and inputting the temperature into the controller.

8. The method according to claim 7, further comprising adjusting the BEMF coefficient according the sensed temperature using the controller to provide an adjusted BEMF coefficient and using the adjusted BEMF coefficient as the BEMF coefficient in determining a first voltage or current and as the BEMF coefficient in determining the second voltage or current.

9. The method according to claim 1, wherein receiving a BEMF coefficient comprises learning the BEMF coefficient while the electric machine operates using a default BEMF coefficient.

10. The method according to claim 9, wherein learning the BEMF coefficient comprises measuring the BEMF, measuring the motor speed, and dividing the BEMF by the motor speed to provide the learned BEMF coefficient.

11. The method according to claim 1, wherein receiving the BEMF coefficient comprises scanning a UPC label having the BEMF coefficient affixed to the electric machine or reading an RFID tag having the BEMF coefficient affixed to the electric machine.

12. The method according to claim 1, further comprising receiving a nominal BEMF coefficient for a model or type of electric machine being operated wherein determining a first voltage or current or determining a second voltage or current comprises using an amount of deviation between the received BEMF for the electric machine being controlled and the nominal BEMF.

13. An apparatus for controlling a specific electric machine, the apparatus comprising:
   an inverter coupled to the electric machine and configured to invert direct current electricity to multi-phase electricity that is applied to the electric machine in motor mode or to convert multi-phase electricity received from the electric machine in generator mode to direct current electricity; and
   a controller coupled to the inverter and configured to:
      receive a back electromotive force (BEMF) coefficient for the specific electric machine being controlled;
      receive an input related to a selected torque to be applied by the electric machine in the motor mode or an input related to a selected power to be removed from the electric machine in the generator mode; and determine a first voltage or current having a first characteristic the inverter is to apply to the electric machine in the motor mode using the BEMF coefficient in order to achieve the selected torque or determine a second voltage or current having a second characteristic the inverter is to convert received multi-phase electricity to using the BEMF coefficient in order to remove the selected power from the electric machine in the generator mode.

14. The apparatus according to claim 13, further comprising a speed sensor configured to sense a speed of the electric machine and to input the sensed speed to the controller wherein the controller is configured to determine an operating point of the electric machine using the sensed speed and to determine the first voltage or current or to determine the second voltage or current from the operating point.

15. The apparatus according to claim 13, further comprising a temperature sensor configured to sense a temperature of the electric machine wherein the controller is configured to receive the sensed temperature and to adjust the BEMF coefficient according the sensed temperature to provide an adjusted BEMF coefficient that is used as the BEMF coefficient in determining a first voltage or current and as the BEMF coefficient in determining the second voltage or current.

16. The apparatus according to claim 13, wherein the controller is configured to learn the BEMF coefficient by measuring the BEMF of the electric machine using a voltage sensor while the electric machine operates using a default BEMF, measuring the motor speed using a speed sensor, and dividing the BEMF by the motor speed using a processor to provide the learned BEMF coefficient.

17. The apparatus according to claim 13, further comprising a battery coupled to the inverter.

18. The apparatus according to claim 13, wherein the first characteristic comprises at least one selection from a group consisting of a peak value, a root-mean-square value, a frequency, and a time duration for application during a frequency cycle and the second characteristic comprises at least one selection from a group consisting of a peak value, a root-mean-square value, a frequency, and a time duration for conversion during a frequency cycle.

19. A vehicle system comprising:
a vehicle comprising a drive mechanism;
a specific electric machine coupled to the drive mechanism and configured to power the vehicle or to remove energy from the vehicle to provide braking power;
a battery configured to provide power to the vehicle or to store removed energy;
an inverter configured to invert direct current electricity from the battery to multi-phase electricity applied to the electric machine operating in motor mode or to convert multi-phase electricity from the electric machine operating in generator mode to direct current electricity provided to the battery; and
a controller coupled to the inverter and configured to:
receive a back electromotive force coefficient for the specific electric machine being controlled;
receive an input related to a selected torque to be applied by the electric machine in the motor mode or an input related to a selected power to be removed from the electric machine in the generator mode; and
determine a first voltage or current having a first characteristic the inverter is to apply to the electric machine in the motor mode using the BEMF coefficient in order to achieve the selected torque or determine a second voltage or current having a second characteristic the inverter is to convert received multi-phase electricity to using the BEMF coefficient in order to remove the selected power from the electric machine in the generator mode.

* * * * *